United States Patent
Farkas et al.

(10) Patent No.: US 11,757,685 B1
(45) Date of Patent: Sep. 12, 2023

(54) SYSTEM LEVEL OPTIMIZATION FOR TRAINING A HIGH-SPEED DATA COMMUNICATION INTERFACE

(71) Applicant: DELL PRODUCTS L.P., Round Rock, TX (US)

(72) Inventors: Sandor Farkas, Round Rock, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/729,146

(22) Filed: Apr. 26, 2022

(51) Int. Cl.
- *H04L 27/01* (2006.01)
- *H04L 27/14* (2006.01)
- *H04L 27/12* (2006.01)

(52) U.S. Cl.
CPC ............ *H04L 27/01* (2013.01); *H04L 27/12* (2013.01); *H04L 27/14* (2013.01)

(58) Field of Classification Search
CPC .......... H04L 27/01; H04L 27/12; H04L 27/14
See application file for complete search history.

(56) References Cited

U.S. PATENT DOCUMENTS

| | | | |
|---|---|---|---|
| 8,599,913 B1 * | 12/2013 | Brown | G06F 13/4027 375/232 |
| 9,645,965 B2 | 5/2017 | Das Sharma et al. | |
| 2013/0070823 A1 * | 3/2013 | Malkin | H04L 25/03878 375/220 |
| 2015/0188589 A1 * | 7/2015 | Wu | H04L 25/0284 375/219 |
| 2022/0247652 A1 * | 8/2022 | Balasubramonian | H04L 43/16 |
| 2023/0098514 A1 * | 3/2023 | Meaney | H04L 7/0008 375/354 |

FOREIGN PATENT DOCUMENTS

EP 2778938 B1 4/2017

* cited by examiner

*Primary Examiner* — Dac V Ha
(74) *Attorney, Agent, or Firm* — Larson Newman, LLP

(57) ABSTRACT

An information handling system includes a high-speed data communication link and a processor. The link includes lanes that each includes a transmitter with an equalization setting and a receiver. The processor initiates a training of the high-speed data communication interface to determine a setting value for the equalization setting for each lane, determines a lane quality value for each lane based upon the associated setting value, determines a link score based on the lane quality values, and determines that the lane quality score is outside a threshold range. In response to determining that the lane quality score is outside the threshold range, the processor selects a lane that has a lane quality value that has a greater magnitude than the lane quality values of all other lanes, increases the equalization setting of the first lane, and initiates a retraining of the other lanes.

20 Claims, 4 Drawing Sheets

SYSTEM LEVEL OPTIMIZATION FOR TRAINING A HIGH-SPEED DATA COMMUNICATION INTERFACE

FIELD OF THE DISCLOSURE

This disclosure generally relates to information handling systems and more particularly relates to a system level optimization for training a high-speed data communication interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a high-speed data communication link and a processor. The link may include lanes that each includes a transmitter with an equalization setting and a receiver. The processor may initiate a training of the high-speed data communication interface to determine a setting value for the equalization setting for each lane, determine a lane quality value for each lane based upon the associated setting value, determine a link score based on the lane quality values, and determine that the lane quality score is outside a threshold range. In response to determining that the lane quality score is outside the threshold range, the processor may select a lane that has a lane quality value that has a greater magnitude than the lane quality values of all other lanes, increase the equalization setting of the first lane, and initiate a retraining of the other lanes.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application.

The teachings can also be used in other applications, and with several different types of architectures, such as distributed computing architectures, client/server architectures, or middleware server architectures and associated resources.

Figure 1:
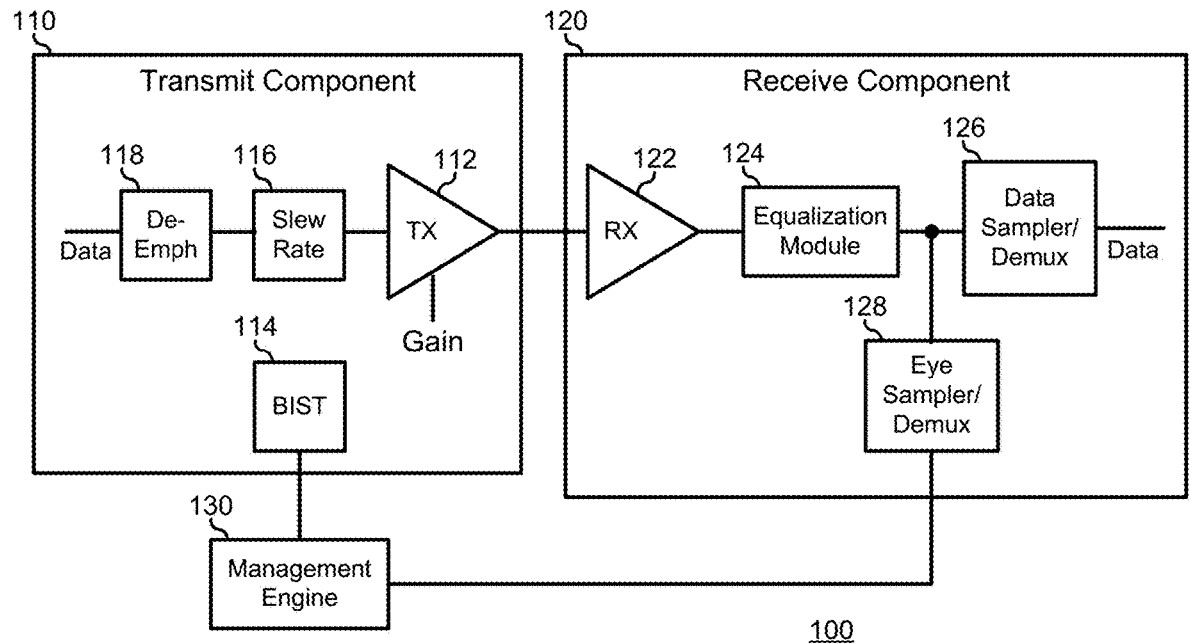
FIG. 1 is a block diagram of a high-speed data communication interface according to an embodiment of the current disclosure.
Figure 1:
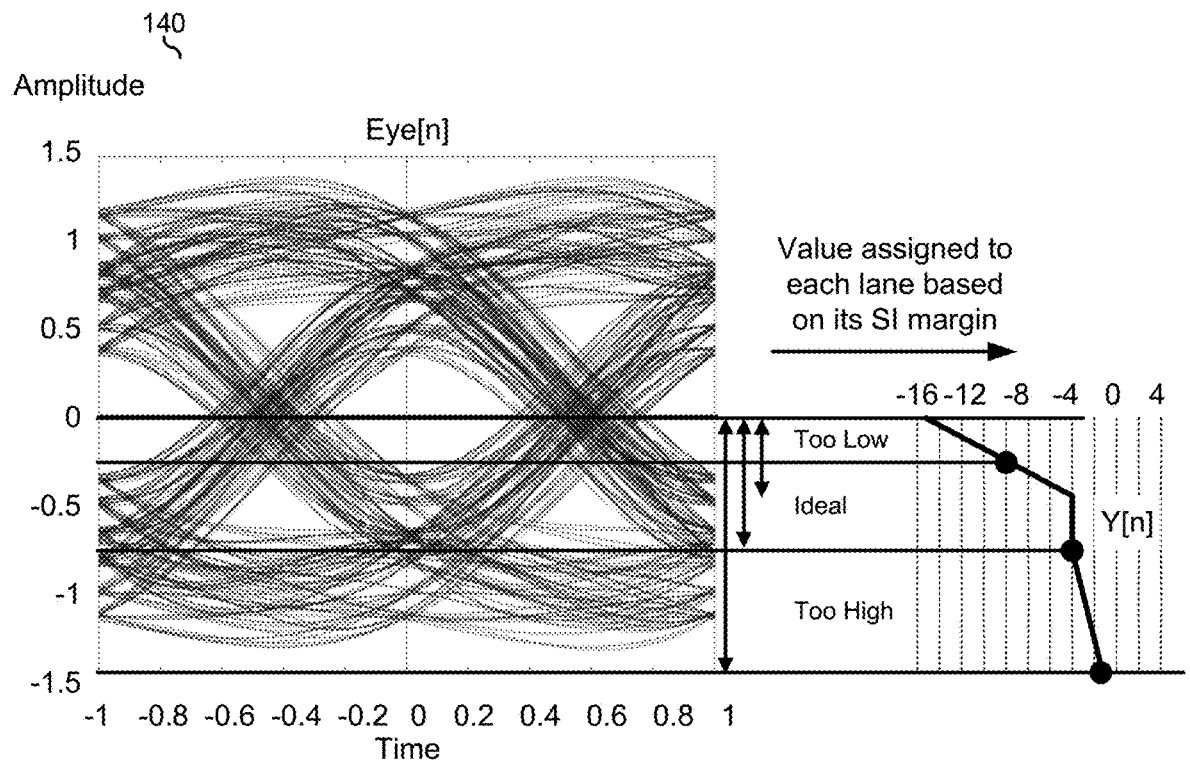

FIG. 1 illustrates a high-speed data communication interface 100, such as may be found in information handling system 400 in FIG. 4, as described below. High-speed data communication interface 100 includes a data transmitting component 110, a data receiving component 120, and a management engine 130. Data transmitting component 110 (hereinafter "transmitter 110") operates to transmit data via a channel to and the data is received by data receiving component 120 (hereinafter "receiver 120"). The channel may be a single-ended data communication interface, as here illustrated, where the data signals are provided over a single conductor and the data values are provided with reference to a common reference voltage, typically a ground level, or the channel may be a double-ended data communication interface where the data signals are provided as differential signals over a pair of conductors, as needed or desired. High-speed data communication interface 100 represents a high-speed serializer/deserializer, in that transmitter 110 receives data and transmits the received data in a serialized fashion, and in that receiver 120 receives the serialized data from the transmitter and deserializes the data to extract the original data.

Examples of a high-speed data communication interface include a memory interface, such as a Double-Data Rate (DDR) interface, a Small Form Factor Pluggable (SFP+) interface for network communications, a Serial-ATA interface, a DisplayPort interface, a PCIe interface, a proprietary high-speed data communication interface, or the like. A typical high-speed data communication interface will include elements for bi-directional data communications. Thus, in a first case, a channel between a transmitter and a receiver may be utilized for bi-directional data transfers (for example DDR interfaces). Here, the typical transmitter component may include receive components as described herein that are coupled to the channel, and the typical receiver component may include transmit components as described herein that are coupled to the channel. In another case, a separate channel may be utilized for data transmission from the receiver component to the transmitter component (for example PCIe interfaces). A typical information handling system will include multiple high-speed data communication interfaces combined to form a larger group of related high-speed data communication interfaces. Here, a single high-speed data communication interface may be referred to as a lane, and the group of high-speed data communication interfaces may be referred to as a link or a bus. The details of high-speed data communication interfaces are known in the art and will not be further described herein, except as needed to illustrate the current embodiments.

Transmitter 110 includes a physical layer transmitter 112 (hereinafter "transmit PHY 112"), a Built-In Self Test (BIST) module 114, a slew rate module 116, and a de-emphasis module 118. Transmit PHY 112 includes a gain input that adjusts the amplitude of the signal from the transmit PHY. Slew rate module 116 adjusts a rate of the transitions of the signal from transmit PHY 112 from a high state to a low state, and from the low state to the high state. De-emphasis module 118 provides select attenuation of the signal from transmit PHY 112 to equalize the frequency response of the channel between the transmit PHY and a receiver PHY 122 (described below) in order to minimize inter-symbol interference. Transmitter 110 may include other equalization modules such as a feed-forward equalization module, as needed or desired. It will be understood that signal gain, signal slew rate, and signal de-emphasis have a large effect on signal cross talk between lanes of a high-speed data communication link. In a normal data transmission operating mode, transmit PHY 112 receives data, and converts the received data into electrical signals on the channel to receiver 120. In some cases, such as in parallel bus type high-speed data communication interfaces, like DDR data communication interfaces, the data conversion may include a bit-by-bit translation of the received data bits into associated signals on the channel. In other cases, such as serial type high-speed data communication interfaces, like PCIe data communication interfaces, the data conversion may include an encoding step, such as an 8-bit/10-bit encoding, to ensure adequate state changes are received in the receiver for clock recovery or the like. The operation of BIST module 114 will be described further below.

Receiver 120 includes a physical layer receiver 122 (hereinafter "receive PHY 122"), an equalization module 124, a data sampler/demultiplexor 126, and an eye sampler/demultiplexor 128. In the normal operating mode, receive PHY 122 receives the electrical signals from the channel. It will be understood that in a typical high-speed data communication interface, the data stream as provided to transmit PHY 112 is not simply "read" from an output of receive PHY 122. This is because the margins for voltage levels and the time duration of the received signals are so small that the distortion effects from the channel result in a received signal that is typically unrecognizable as data without significant post-processing to recover the data stream. As such, the output from receive PHY 122 is provided to equalization module 124 for processing, and the output of equalization module is provided to data sampler/demultiplexor 126 before the data stream is recovered.

Equalization module 124 operates to clean up the received signal from receive PHY 122 by compensating for the distortion effects from the channel. For example, equalization module 124 may include an automatic gain control (AGC) module, a continuous-time linear equalization (CTLE) module, and decision feedback (DFE) module, or other equalization modules as needed or desired. An AGC module is a feedback amplifier that operates to amplify the received signal from a transmitter to provide a constant level signal to the rest of the elements of the receiver. A CTLE module is a linear filter that attenuates low-frequency components of the signal received from an AGC module that amplifies components of the signal around the Nyquist frequency of the signal, and filters off high-frequency components of the signal. A DFE module is a non-linear equalization which relies on decisions about the levels of previous symbols (high/low) in the signal received from the transmitter in order to clean up a current symbol, thereby accounting for distortion in the current symbol that is caused by the previous symbols. The details of channel equalization, and in particular of AGC, CTLE, and INT equalizations are known in the art and will not be further described herein, except as needed to illustrate the current embodiments. The result of the processing by equalization module 124 is to present a clean data eye to data sampler/demultiplexor 126 which extracts the data stream from the data eye for use by other elements of receiver 120 as needed or desired. The details of data recovery in a receiver of a high-speed data communication interface are known in the art and will not be further described herein, except as needed to illustrate the current embodiments.

Eye sampler/demultiplexor 128 is similar to data sampler/demultiplexor 126, and receives the data eye. Here, the data eye represents a flow of data bits on the channel that can be depicted an instrument trace of multiple data bits from the data stream. As such, data sampler/demultiplexor 126 is focused upon extracting the individual data bits from the data stream, while eye sampler/demultiplexor 128 is focused on the issues of the quality of the data eye, and particularly on determining the eye height and eye width of the data eye to ensure that sufficient margins are maintained as a result of the equalization process performed by equalization module 124.

In various embodiments, eye sampler/demultiplexor 128 operates in a training mode to provide feedback as to the sufficiency and consistency of the settings of the various stages of the transmitter and receiver equalization blocks in maintaining adequate margins in the data eye of each lane of a high-speed data communication link to improve the ability of data sampler/demultiplexor 126 to detect the data stream and to reduce the bit error rate of the detection process. In other embodiments, eye sampler/demultiplexor 128 operates in a run time mode to detect changes in data eye 140 and to proactively notify of the changes, or to amend the settings of the various stages of equalization blocks to maintain the bit error rate within satisfactory levels.

In a particular embodiment, in the training mode, eye sampler/demultiplexor 128 coordinates link training with transmitter 110. Here, eye sampler/demultiplexor 128 operates to communicate training results to management engine 130 to determine when the settings of the various stages of transmitter equalization (the gain, slew rate, and de-emphasis settings) and of equalization module 124 have converged on a satisfactory set of values to create the adequate margins in the data eye. Here, during a power-on phase, BIST module 114 operates to transmit training data via transmit PHY 112 utilizing various settings for gain, slew rate module 116, and de-emphasis module 118. Then eye sampler/demultiplexor 128, upon detecting an unsatisfactory data eye, systematically adjusts the settings within equalization module 124, until the detected eye exhibits the adequate margin to ensure that the bit error rate remains below a predetermined level. In another embodiment, the training is repeatedly performed. Here, it is understood that the same or similar settings for gain, slew rate module 116, de-emphasis module 118, and equalization module 124 will be expected, and eye sampler/demultiplexor 128 selects as a final set of setting values the setting values that represent a best set of setting values. The best set of setting values can be determined as a most commonly reoccurring value for each setting, as an average of the values over the repeated training runs, as the value for each setting that exhibited the best eye margins, or other methods for analyzing the values of the repeated training runs.

Management engine 130 is connected to transmitter 110 and to receiver 120 to coordinate the operations of high-speed data communication interface 100 in the training mode. In particular, management engine 130 operates to direct transmitter 100 to vary the settings for gain, slew rate module 116, and de-emphasis module 118, to direct BIST module 114 to transmit the iterations of the training sequence test signal based upon the various settings, directs receiver 120 to vary the settings for equalization module 124, and directs eye sampler/demultiplexor 128 to evaluate the resulting eye margins to determine the best setting for each lane of the high-speed data communication link. Management engine 130 may include hooks into other elements of high-speed data communication interface 100 to monitor, manage, and maintain the operations of the test mode.

In a particular embodiment, management engine 130 represents an in-band agent instantiated by a host processor of high-speed data communication interface 100 that operates during a BIST phase and reports the results of the training sequence to a BIOS/UEFI of the information handling system, to a user of the information handling system, to an event logger of the information handling system, or the like. In another embodiment, management engine 130 represents an out-of-band element of the information handling system, such as a Baseboard Management Controller (BMC) or the like, that is connected to a management system (not illustrated) for the information handling system. In a particular embodiment, management engine 130 operates to log the performance of the channel for future reference, and then, in subsequent instances of the test mode, the management engine can compare the performance information with past performance information to detect changes in the performance.

It has been understood by the inventors of the current disclosure that, as the speeds of high-speed data communication interfaces increases, and the voltage margins are tightening, that the channels, including on-chip paths in the transmitter and receiver, circuit traces on the printed circuit board, connector interfaces, solder joints, and the like, are becoming more sensitive. On the other hand, traditional methods of testing and for establishing margins is becoming more constrained because the data signal at the device boundary, that is, at the device input contact, is not expected to resemble the bitstream without the post-processing performed by the equalization block. In other words, the introduction of an instrumented interposer and examining the signal trace at the interposer is too far removed from the end of the channel to be of much use. In particular, such measurement instruments are very artificial because the interposer is different from the device under test, and in any case, circuit sensitivity may be subject to system-to-system variations that make the conclusions drawn on one system inapplicable to other similar systems.

It has been further understood by the inventors of the current disclosure that the training mode, as described above, while optimizing per-lane performance, may not adequately provide for the best performance on the entire high-speed data communication link. In particular, per-lane training may not adequately account for cross talk effects between the lanes of the high-speed data communication link, and may further result in higher overall power consumption by training one or more of the individual links with unnecessarily high margins. The factors that most influence cross talk and power consumption are provided by the settings within transmitter 110. In particular, the settings for gain, slew rate, and de-emphasis are larger factors in cross talk susceptibility and overall power consumption than are the settings for receiver equalization.

In a particular embodiment, a high-speed data communication link that includes multiple high-speed data communication interfaces similar to high-speed data communication interface 100 operates to determine a per-lane quality function based upon one or more of the transmitter equalization settings (gain, slew rate, and de-emphasis) for the associated lane, and, based upon the quality functions of all of the lanes in the link, to derive a link score. The high-speed data communication link then determines whether the link score is above or below a threshold. If the link score is below the threshold, the per-lane equalization settings are determined to be satisfactory, and the equalization settings are locked for run time operation of the link. On the other hand, if the link score is above the threshold, the per lane equalization settings are determined to be unsatisfactory, and an iteration process is commenced to attempt to improve (i.e., lower) the link score.

In the iteration process, the worst lane is selected (i.e., the lane with the greatest magnitude lane quality function), the equalization settings for the selected lane are modified, the training of the other lanes is repeated, new per-lane quality functions are re-determined, and a new link score is calculated. If the repeated iteration process produces a satisfactory link score (i.e., a link score that is below a threshold), then the newly determined equalization settings are locked for run time operation of the link. On the other hand, if the repeated iteration process fails to produce a satisfactory link score, the high-speed data communication link can provide various responses as needed or desired. For example, when the repeated iteration process fails to produce a satisfactory link score, the high-speed data communication link can provide for the retraining of the link at a slower speed, the high-speed data communication link can reset the equalization settings to the original training results and provide a warning that the link is not operating in an optimal state, the high-speed data communication link can halt training and provide an indication of a link training failure, or other responses, as needed or desired.

The following elaboration on the above process is provided as an example, and is based upon modification of only a gain setting for a particular lane (i.e., the lane with the greatest magnitude land quality function) of a high-speed data communication link. It may be understood that other equalization settings, such as slew the rate setting, the de-emphasis setting, or other transmitter settings of the transmitter of the lane may be provided as a basis for the per-lane quality function, and may form the basis of the iteration process, as needed or desired. Moreover, a combination of the transmitter equalization settings may be provided as a basis for the per-lane quality function. For example, a per-lane quality function may be defined that includes weighted factors for the gain setting, the slew rate setting, and the de-emphasis setting, as needed or desired.

The determination of a gain-based per-lane quality function is based upon an understanding of the data eye 140, as may be recovered by eye sampler/demultiplexor 128. Data eye 140 is illustrated with the range of transmitter gain settings overlaid on the data eye. Here, it will be understood that, the characteristics of data eye 140 will be subject to the design of high-speed data communication interface 100, and more particularly to the design, layout, and manufacture of the channel between transmitter 110 and receiver 120, and the design, layout, an manufacture of the channels associated with the other lanes in the high-speed data communication link, and their proximity to each other. From a design perspective, high-speed data communication interface 100 would ideally be expected to be operated with a gain setting for transmit PHY 112 in a particular optimal range. That is, gain settings for transmit PHY 112 within the optimal range should theoretically produce eye heights in data eye 140 that are sufficiently high to maintain an acceptable bit error rate, while not resulting in excessive power consumption by high-speed data communication interface 100. Consequently, gain settings that are below this optimal range should be expected to produce a smaller eye height in data eye 140, and such smaller eye height could produce a higher bit error rate due to the number of data transitions that fall below the detection threshold of receiver PHY 122. Similarly, gain settings that are above this optimal range should be expected to produce a larger eye height in data eye 140, and such larger eye height, while likely to produce a satisfactory bit error rate, would result in higher power consumption by high-speed data communication interface 100 than is necessary.

Figure 2:
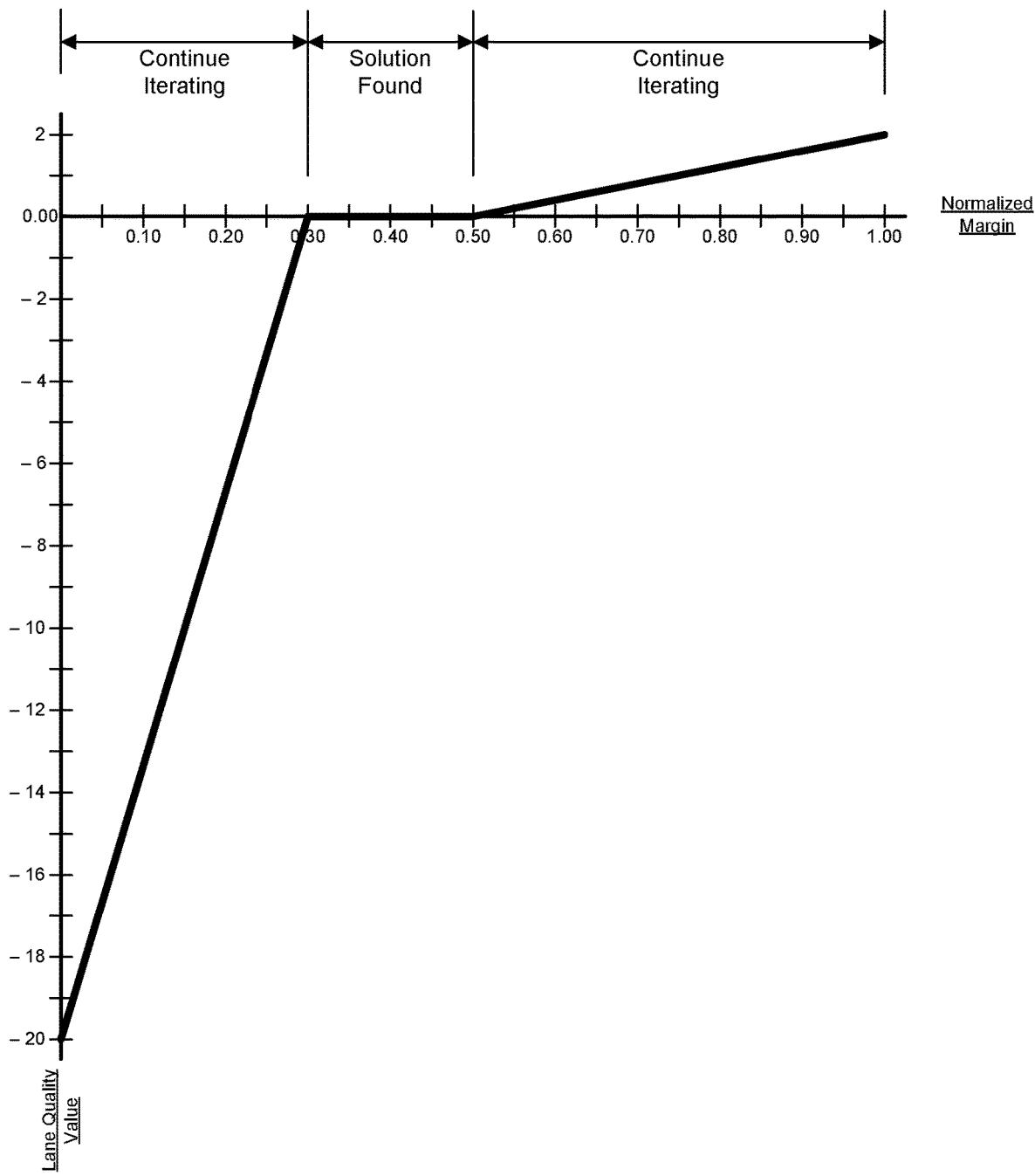
FIG. 2 is a graph of a lane quality function according to an embodiment of the current disclosure.

Data eye 140 is illustrated with a per-lane quality function based upon the gain settings of transmit PHY 112. FIG. 2 illustrates a quality function 200 that is expanded to show further details. Here, in the x-axis, the receiver eye margin values are normalized between zero and one. This is provided for illustrative purposes, as the particular gain setting values for a transmit PHY will be dependent upon the design of the high-speed data communication interface, and may be subject to a specification associated with the type of high-speed data communication interface. As such, an eye margin of zero (0), as depicted in quality function 200, should not be understood to be associated with a null output on the associated transmit PHY, or a zero (0) gain. Similarly, an eye margin of one (1), as depicted in quality function 200, should not be understood to be associated with unity gain, but rather should be understood to be associated with the highest gain setting for the high-speed data communication interface. Note further that the actual gain settings of a transmit PHY for a typical high-speed data communication interface will not likely be provided by an analog input, but rather by a step-wise increasing digital input, such as where a gain setting is specified by a particular bit-field instantiated by the transmitter. As such, the number of gain settings and the granularity of the resulting quality function will depend on the particular functions and features of the transmitter, the design of the high-speed data communication interface, and the specification associated with the high-speed data communication interface.

The y-axis of quality function 200 provides a range of quality values from minus twenty (−20) to positive two (+2). It should be understood that the range and values of the quality values of a quality function may be selected based upon design judgement, that the illustrated range is exemplary, and that other ranges may be utilized, as needed or desired. However, the characteristics of the quality function can be seen based upon the illustrated range. Thus, it will be understood from quality function 200 that the optimal range for the eye margin is found with eye margins in the range of 0.30 to 0.50, and that the quality value ascribed to eye margins within the optimal range is zero (0). Eye margins below the optimal range (i.e., gain values in the range of 0.30 down to 0.00) are ascribed decreasing quality values in the range of zero (0) (at an eye margin of 0.03) down to minus twenty (−20) (at an eye margin of 0.00). Eye margins above the optimal range (i.e., eye margin values in the range of 0.50 to 1.00) are ascribed increasing quality values in the range of zero (0) (at an eye margin of 0.50) to positive two (+2) (at an eye margin of 1.00). The steep slope of quality function 200 in the low-margin region as compared to the slope in the high-margin region, reflects an understanding that the higher bit error rate associated with lower margin values is a more critical issue than is the excessive power consumption associated with higher margain values. Quality function 200 may represent a common quality function for each lane of the high-speed data communication link, or a different quality function may be implemented for each lane, as needed or desired. That is, the shape of the quality function may differ from lane to lane, as needed or desired. In a particular embodiment, quality function 200 may be implemented as a mathematical formulation that correlates the normalized eye margins with the quality value. In this way, a non-linear relation between the normalized eye margins and the quality value may be customized for the design of the lanes and the high-speed data communication link, as needed or desired. In a particular embodiment, quality function 200 may be implemented as a look up table that correlates the normalized margin values with the quality value.

Figure 3:
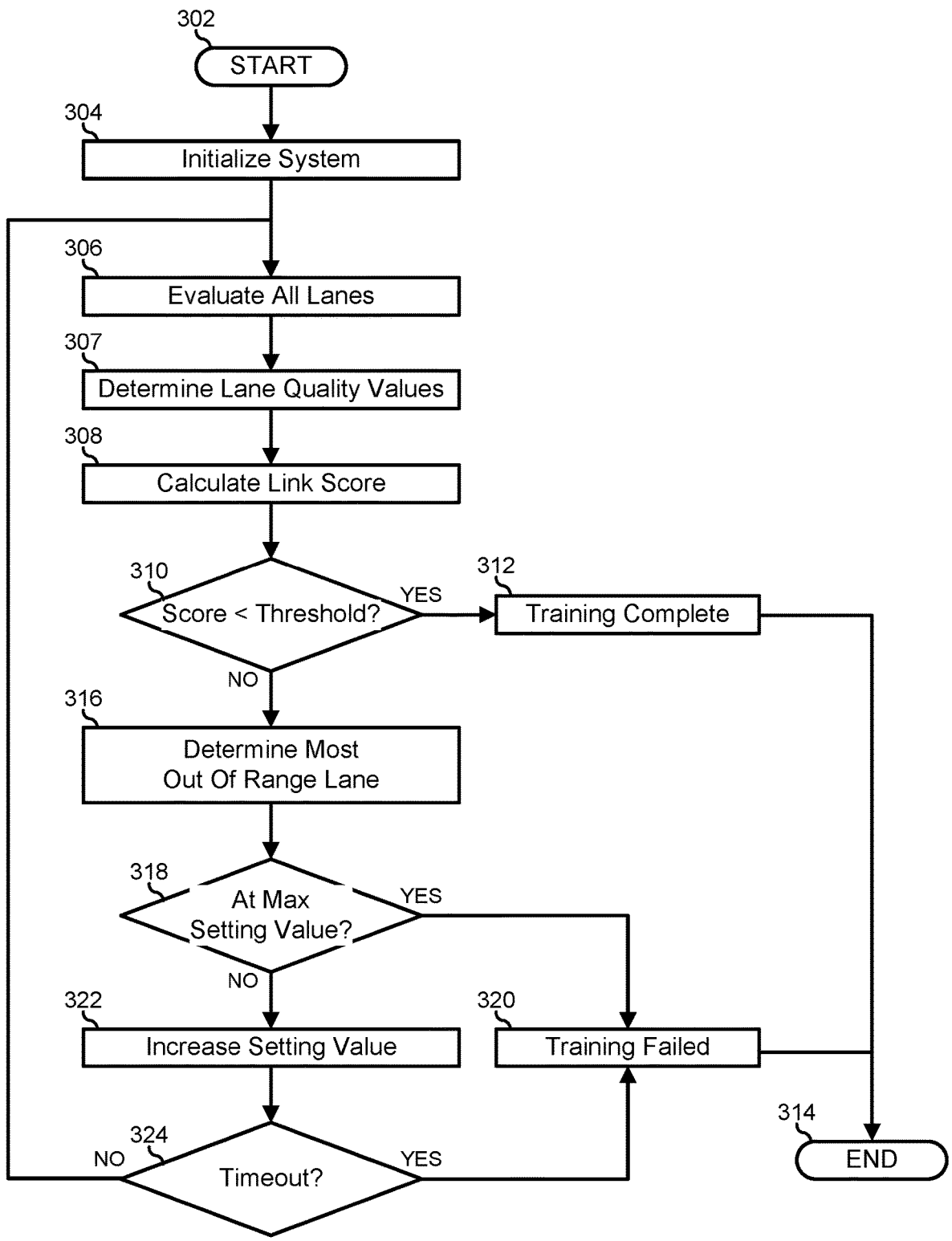
FIG. 3 is a flowchart illustrating a method for providing system level optimization for training a high-speed data communication interface according to an embodiment of the current disclosure.

FIG. 3 illustrates a method 300 for providing system level optimization for training a high-speed data communication interface, starting at block 302. Method 300 may be understood to be applicable to adjustments to gain settings, to slew rate settings, to de-emphasis settings, to other settings in the transmitters or receivers of the high-speed data communication interface, or to a combination of the settings, as needed or desired. An information handling system that includes a high-speed data communication link is initialized in block 304. The initialization of the information handling system may include setting data eye margin thresholds and timeouts, setting all equalization settings of the transmit PHYs of the interface to their lowest settings, and initiating test pattern on all lanes of the link. The data eyes of each lane are evaluated by the receivers of each lane in block 306. The lane quality value for each lane is determined based upon the associated per-lane quality function in block 307. An overall link score is determined in block 308. For example, all of the lane quality values may be summed together to obtain a link score, or another method of providing a link score, such as a weighted sum of the lane quality values may be utilized, as needed or desired. In a particular embodiment, because quality function 200 includes quality values that are both positive and negative, the overall link score as determined in block 308 may represent a least mean squared (LMS) function, where each lane quality value is squared and then the squared values are summed to ensure that a positive value is provided for the overall link score.

A decision is made as to whether or not the link score is below a link score threshold in decision block 310. Here, it will be understood that, if all lanes are operating within the optimal range for the particular setting, then the link score will be equal to zero (0). Here, a design decision may be made as to an acceptable amount of variance from this optimal value. For example, having one or more lanes operating with a slightly lower or higher gain setting may be deemed to be acceptable, and so a non-zero link score threshold may be provided. Further, it may be deemed to be desirable to provide a range of acceptability for the link score value, where the negative range and the positive range differ. For example, a link score within the range of minus two (−2) to plus one (+1), or another range may be deemed to be acceptable, as needed or desired. If the link score is below the link score threshold, the "YES" branch of decision block 310 is taken, training is completed and the equalization settings are locked for run time operation in block 312, and the method ends in block 314.

If not, the "NO" branch of decision block 310 is taken and the lane that is furthest outside the link score threshold is determined in block 316. A decision is made as to whether or not the most out of range lane is being operated at its maximum setting in decision block 318. If so, the "YES" branch of decision block 318 is taken, the training is determined to have failed in block 320, and the method ends in block 314. If the training is determined to have failed, the information handling system may retry the training at a slower speed, may retain the less than optimal settings and provide an indication that the link is not optimally trained, may halt all operations on the link and indicate that the link training failed, or otherwise indicate that the training failed, as needed or desired. If the most out of range lane is not being operated at its maximum setting, the "NO" branch of decision block 318 is taken and the setting or settings for the particular lane is changed in block 322. Note here that, based upon the quality function as depicted in FIG. 2, the lane quality function can be a negative value or a positive value. As such, if the lane quality function for the selected link is a negative value, then the setting or settings for the particular lane will be understood to be increased, while positive lane quality function values will be associated with a decrease in the setting or settings for the particular lane. A decision is made as to whether or not a timeout for link training has expired in decision block 324. If so, the "YES" branch of decision block 324 is taken and the method proceeds to block 320 where the training is determined to have failed as described above. If not, the "NO" branch of decision block 324 is taken and the method returns to block 306 where the data eyes of each lane are reevaluated by the receivers of each lane.

Figure 4:
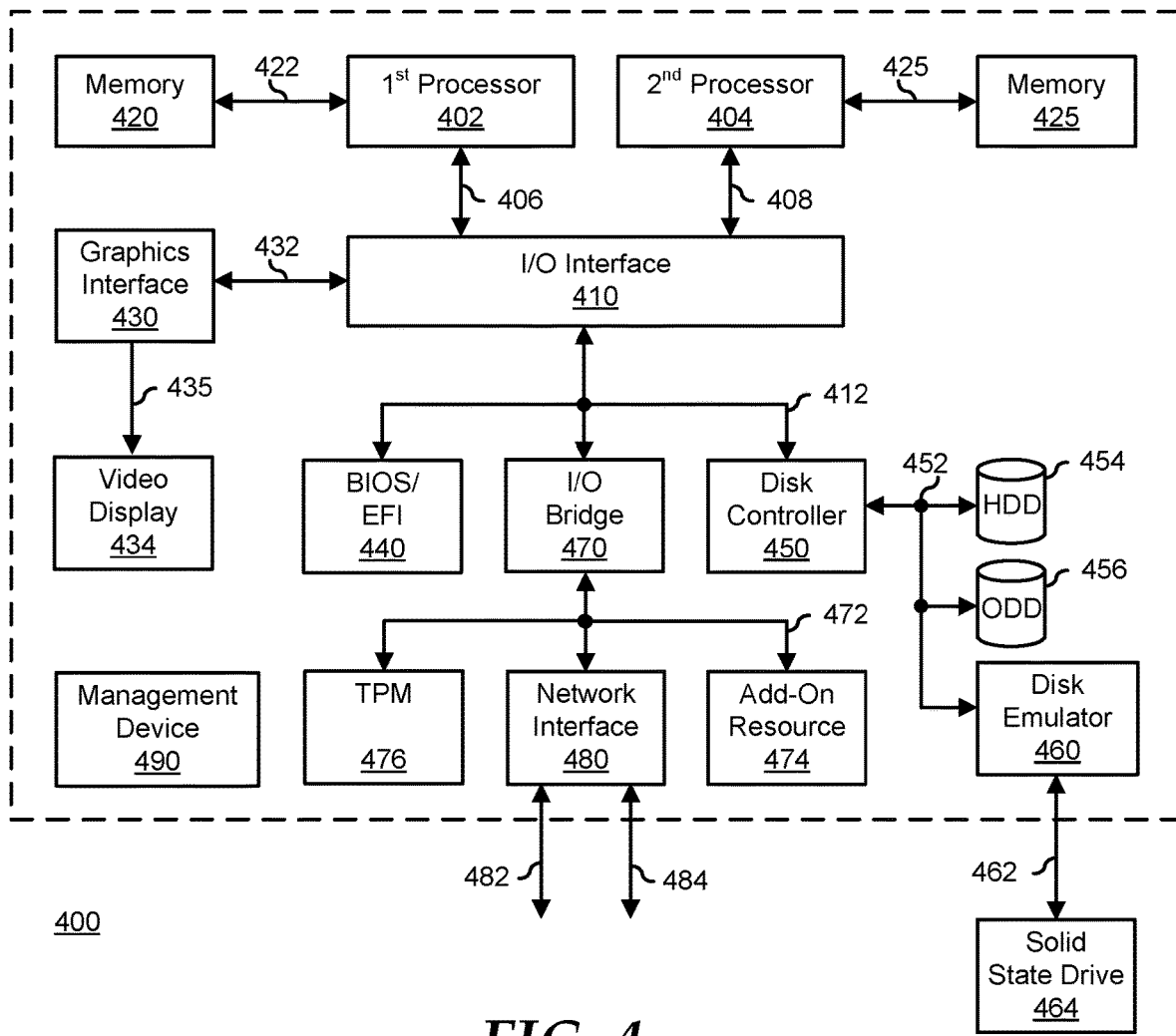
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a high-speed data communication link including a plurality of lanes, each lane including a transmitter having a first equalization setting and a receiver having a data eye sampler; and
a processor configured to initiate a training of the high-speed data communication interface to determine a first setting value for the first equalization setting for each lane, to determine a lane quality value for each lane in response to the training based upon the associated first setting value, to determine a link score based on the lane quality values, to determine that the lane quality score is outside a threshold range, and, in response to determining that the lane quality score is outside the threshold range, to select a first lane, the first lane having a first lane quality value that has a greater magnitude than the lane quality values of all other lanes, to increase the first equalization setting of the first lane, and to initiate a retraining of the other lanes.

2. The information handling system of claim 1, wherein the lane quality value for each lane is determined based upon a lane quality function for each lane.

3. The information handling system of claim 2, wherein the lane quality function for each lane is a same lane quality function.

4. The information handling system of claim 2, wherein the lane quality function for each lane is a unique lane quality function for the associated lane.

5. The information handling system of claim 2, wherein the lane quality function for each lane ascribes a particular lane quality value for each setting value for the first equalization setting.

6. The information handling system of claim 5, wherein the lane quality function includes a first range of setting values associated with a low range of lane quality values, a second range of setting values associated with a middle range of lane quality values, and a third range of setting values associated with a high range of lane quality values.

7. The information handling system of claim 1, wherein the link score is a sum of the lane quality scores.

8. The information handling system of claim 1, wherein each transmitter further includes a second equalization setting, wherein the training further determines a second setting value for the second equalization setting for each lane, wherein the lane quality value for each lane is further based upon the associated second setting value, and, prior to initiating the retraining, the processor is further configured to increase the second equalization setting of the first lane.

9. The information handling system of claim 8, wherein the lane quality value for each lane is determined based upon a weighted average of the first setting value and the second setting value of the associated lane.

10. The information handling system of claim 1, wherein the first setting value for each first equalization setting for each lane is determined based upon the date eye sampler in the associated receiver.

11. A method, comprising:
providing, on an information handling system, a high-speed data communication link including a plurality of lanes, each lane including a transmitter having a first equalization setting and a receiver having a data eye sampler;
initiating, by a processor of the information handling system, a training of the high-speed data communication interface to determine a first setting value for the first equalization setting for each lane;
determining a lane quality value for each lane in response to the training based upon the associated first setting value;
determining a link score based on the lane quality values;
determining that the lane quality score is outside a threshold range; and
in response to determining that the lane quality score is outside the threshold range:
selecting a first lane, the first lane having a first lane quality value that has a greater magnitude than the lane quality values of all other lanes;
increasing the first equalization setting of the first lane; and
initiating a retraining of the other lanes.

12. The method of claim 11, wherein the lane quality value for each lane is determined based upon a lane quality function for each lane.

13. The method of claim 12, wherein the lane quality function for each lane is a same lane quality function.

14. The method of claim 12, wherein the lane quality function for each lane is a unique lane quality function for the associated lane.

15. The method of claim 12, wherein the lane quality function for each lane ascribes a particular lane quality value for each setting value for the first equalization setting.

16. The method of claim 15, wherein the lane quality function includes a first range of setting values associated with a low range of lane quality values, a second range of setting values associated with a middle range of lane quality values, and a third range of setting values associated with a high range of lane quality values.

17. The method of claim 11, wherein the link score is a sum of the lane quality scores.

18. The method of claim 11, wherein:
each transmitter further includes a second equalization setting;
the training further determines a second setting value for the second equalization setting for each lane;
the lane quality value for each lane is further based upon the associated second setting value; and
prior to initiating the retraining, the method further comprises:
increasing the second equalization setting of the first lane.

19. The method of claim 18, wherein the lane quality value for each lane is determined based upon a weighted average of the first setting value and the second setting value of the associated lane.

20. An information handling system, comprising:
a Peripheral Component Interconnect—Express (PCIe) link including a plurality of lanes, each lane including a transmitter having a first equalization setting and a receiver having a data eye sampler; and
a baseboard management controller configured to initiate a training of the high-speed data communication interface to determine a first setting value for the first equalization setting for each lane, to determine a lane quality value for each lane in response to the training based upon the associated first setting value, to determine a link score based on the lane quality values, to determine that the lane quality score is outside a threshold range, and, in response to determining that the lane quality score is outside the threshold range, to select a first lane, the first lane having a first lane quality value that has a greater magnitude than the lane quality values of all other lanes, to increase the first equalization setting of the first lane, and to initiate a retraining of the other lanes;
wherein the lane quality value for each lane is determined based upon a lane quality function for each lane, and wherein the link score is a sum of the lane quality scores.

* * * * *